No. 635,055. Patented Oct. 17, 1899.
J. McEWEN.
MACHINE FOR MOLDING POPCORN.
(Application filed Nov. 20, 1897.)
(No Model.) 2 Sheets—Sheet 1.
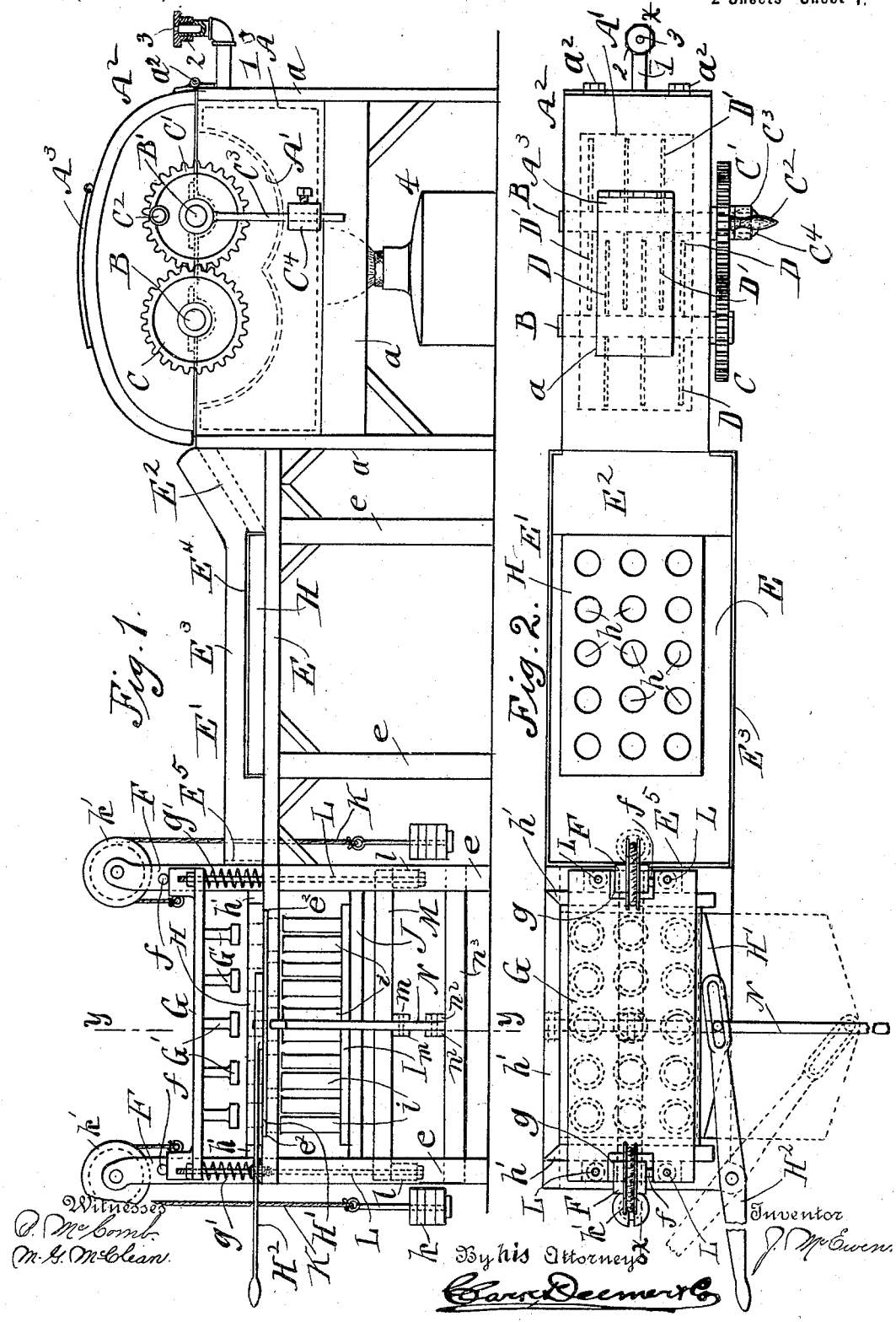

No. 635,055. Patented Oct. 17, 1899.
J. McEWEN.
MACHINE FOR MOLDING POPCORN.
(Application filed Nov. 20, 1897.)
(No Model.) 2 Sheets—Sheet 2.
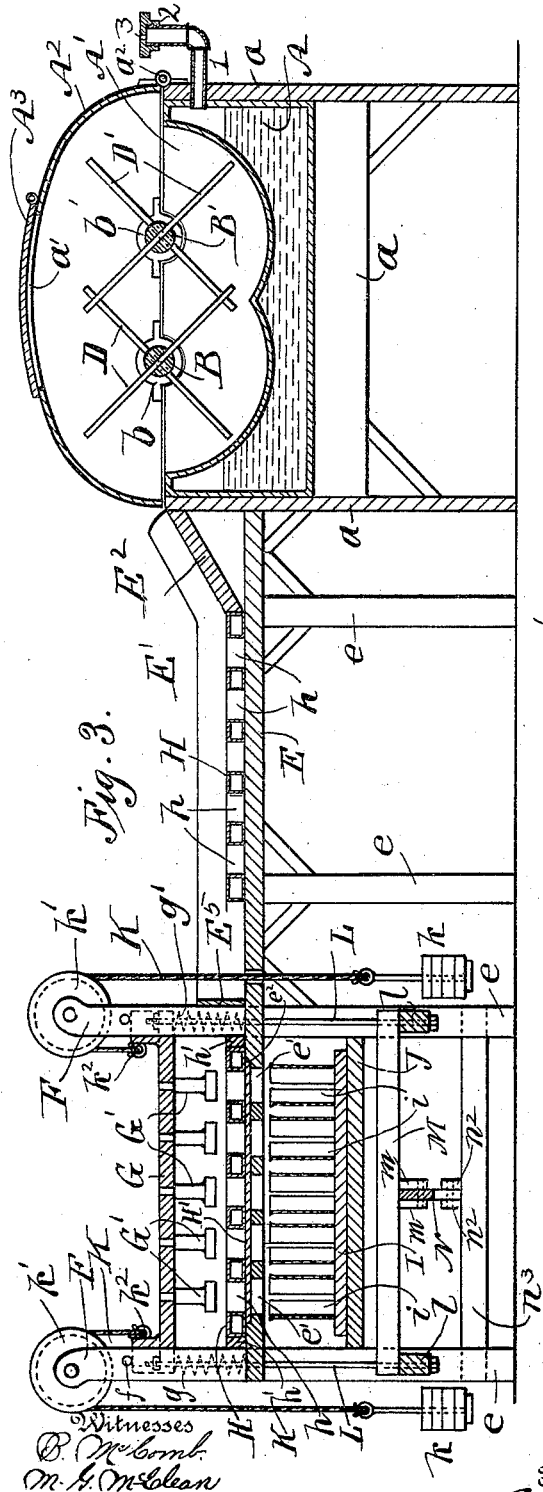
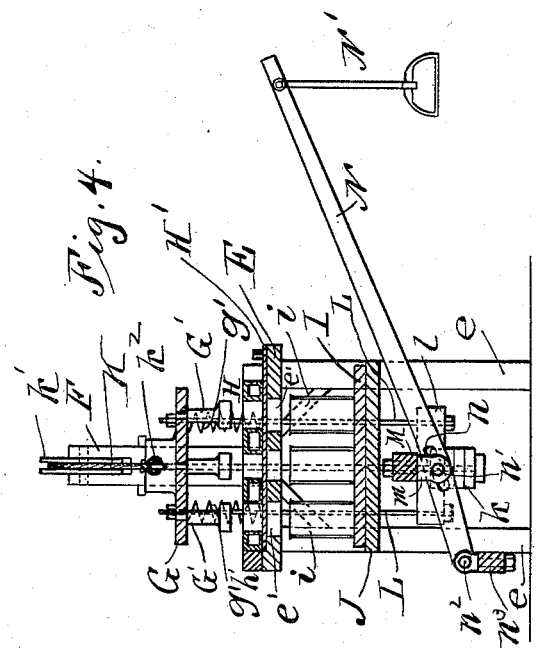
Witnesses
Inventor
By his Attorneys

UNITED STATES PATENT OFFICE.

JOHN McEWEN, OF NEW YORK, N. Y.

MACHINE FOR MOLDING POP-CORN.

SPECIFICATION forming part of Letters Patent No. 635,055, dated October 17, 1899.

Application filed November 20, 1897. Serial No. 659,239. (No model.)

*To all whom it may concern:*

Be it known that I, JOHN MCEWEN, a citizen of the United States, and a resident of New York, (Brooklyn,) county of Kings, and State of New York, have invented certain new and useful Improvements in Machines for Molding Pop-Corn, of which the following is a specification, reference being had to the accompanying drawings, forming a part thereof, in which similar letters and figures of reference indicate corresponding parts.

This invention relates to an improved shaping apparatus for manufacturing blocks of pop-corn, candy, &c., the object thereof being to provide an efficient and inexpensive device of this class so constructed as to enable an operator to produce a large quantity of manufactured product in a short time and by a minimum expenditure of labor.

The invention will be hereinafter fully described, and specifically set forth in the annexed claims.

In the accompanying drawings, forming part of this specification, Figure 1 is a front elevation of my improved device. Fig. 2 is a plan view thereof. Fig. 3 is a longitudinal sectional elevation taken on the line $x\ x$ of Fig. 2, and Fig. 4 is a cross-sectional elevation taken on the line $y\ y$ of Fig. 1.

In the practice of my invention I provide, primarily, a boiler A. This said boiler is composed of any suitable sheet metal, and it is incased around its sides with wooden plates $a$. Formed in the upper wall of the boiler A is a concaved receptacle A', and normally closing this said receptacle is a lid $A^2$, having an opening $a'$ therethrough and a door $A^3$ thereon for closing the said opening.

Journaled in boxes $b$, secured to the side walls of the lid $A^2$, are shafts B and B', these said shafts being connected to intermeshing pinions C and C', the pinion C' having a handle $C^2$ thereon for revolving it. Extended radially from the inner portions of the shafts B and B' are a series of paddles D and D', adapted to be revolved in opposite directions for the purpose of mixing the contents of the receptacle A'. These said paddles may be of any suitable adapted shape, and the two sets interlock for the purpose of thoroughly mixing the contents of the receptacle A'.

Secured to the driving-shaft B' is an extended rod $C^3$, having an adjustable balance-weight $C^4$ thereon for assisting an operator to turn the shaft B', this weight after passing the dead-center on its upward motion tending to automatically assist the operation of turning the pinion $C^2$ and shaft B' by momentum.

Leading into the boiler A is a feed-pipe 1, which is normally closed by means of a cap 2. This said cap has an aperture 3 therethrough for exhausting steam from the boiler A to prevent injury thereto by excess of pressure. The lid $A^2$ is connected to the boiler-casing by means of a hinge $a^2$, whereby the said lid and its connected beaters can be thrown back for the purpose of filling and emptying the receptacle A'. The door $A^3$ permits of adding additional contents to the receptacle A' after the lid $A^2$ is closed.

As a means for heating the water contained in the boiler A a suitable spirit lamp or stove 4 is placed beneath the said boiler.

Connected to the casing $a$ of the boiler A and extended longitudinally therefrom is a table E, which is supported by suitable legs $e$.

Projected upwardly from one end of the table E are uprights F. These said uprights engage slots $g$, formed in the ends of a vertically-movable plate G, which carries a series of plungers. These said plungers are adapted to engage a series of apertures $h$ in a mold H, the mold H being preferably composed of sheet metal for the purpose of durability and lightness. A guide $h'$ is formed upon the table E for the purpose of setting the mold H in accurate position whereby its openings $h$ are in exact vertical alinement with the plungers G'.

Formed through the table E, beneath the openings $h$ of the mold H, are a series of openings $e'$. These said openings communicate with a series of cylindrical receptacles $i$, mounted upon a plate I, the said plate resting on a platform J. Located over the openings $e'$ and normally closing them is a sliding plate H', which is operated by a lever $H^2$ and engages a shallow groove $e^2$ in the table-top E, whereby an even upper surface is maintained.

The plate G is maintained normally in a raised position by means of weights $k$, connected to cords or chains K, which pass over pulleys $k'$, journaled in the upper ends of the uprights F, the free ends of the cords K being secured to eyes $k^2$, connected to the plate G, the upward movement of the plate G being limited by stops $f$. Extended downwardly from each corner of the plate G are rods L, which are connected to each other by cross-bars $l$ and a longitudinal beam M. Connected to this said beam by means of lugs $m$ is a lever N, with a slot $n$ therein, engaging a pin $n'$, the lower end of the said lever being fulcrumed to lugs $n^2$, mounted upon the longitudinal beam $n^3$.

As a means for assisting the weights to lift the plate G spiral springs $g'$ are placed around the rods L between the lower surface of the plate G and the upper surface of the table E. A box E' is formed upon the table within the space between the inner upright F and the casing $a$ of the boiler, and an inclined plane $E^2$ is projected from the upper edge of the boiler-casing to the surface of the table for the purpose of carrying the contents of the boiler to the table. The front wall $E^3$ of the box E is provided with a slot $E^4$ to permit of sliding the molds H upon the table. The upper edge of this slot acts to scrape off any surplus matter from the upper surface of the mold while it is being removed from the table. The slot $E^4$ may be placed in the end wall $E^5$ of the box E', if desired, so that the mold H can be moved directly beneath the plungers G' without leaving the table. In this construction it would be necessary to place the uprights F at the corners of the plate G, so that the forming-dies could pass between them.

In the operation and use of the device—for instance, for mixing and forming a batch of pop-corn—the water in the boiler is heated by means of the stove 4. The receptacle A' is then filled to any desired height with popped corn and the lid is closed. Rotary motion is then given to the beaters D and D' through the medium of the driving-pinion C', and a sweetened adhesive substance in liquid form is poured in through the opening $a'$ of the lid $A^2$, revolution being given to the beaters until the mass is thoroughly mixed. Having mixed the mass, a mold H is placed upon the table E, having one end thereof abutting against the inclined plane $E^2$, as illustrated in Fig. 3 of the drawings. The substance within the receptacle A' is then carried downwardly on the inclined plane $E^2$ and packed within the receptacles $h$ of the mold H until they are completely filled. The mold is then placed in position beneath the vertically-movable plungers G', and the contents of the receptacles $h$ are then compressed by bearing downwardly upon the lever N. This operation can be performed by hand or by foot power. When the foot is used, a stirrup N' is attached to the free end of the lever. Having compressed the cakes to a sufficient degree, the sliding plate H', which normally closes the openings $e'$, is forced outwardly into the position illustrated by dotted lines, Fig. 2 of the drawings, by means of the lever $H^2$. Further pressure is then given the lever N, whereby the cakes are forced downwardly into the receptacles $i$. After a sufficient number are contained therein the plate I, carrying the said receptacles, is removed and the same are emptied, this operation being continued indefinitely.

I do not confine myself to the specific details of mere mechanical construction as herein shown and described, as it is obvious that under the scope of my invention I am entitled to slight structural variations of detail.

I do not herein claim the mixing apparatus *per se*, the same forming the subject-matter of a separate and distinct invention.

Having thus described my invention, what I claim as new, and desire to secure by Letters Patent, is—

1. An improved apparatus of the class described, comprising a table or platform, a vertically-movable plate above said table, a series of plungers projected from the lower surface of said plate, a mold carried by the table and having a series of openings therein for engagement with the said plungers, the table being provided with a series of openings registering beneath the openings of the said mold, a sliding plate normally closing the openings in the table, whereby when said sliding plate is moved, the contents of the mold may be forced through the openings in the table, a series of receptacles beneath the table for receiving the said contents, means for operating the vertically-movable plate, substantially as shown and described.

2. An improved apparatus of the class described, comprising a table or platform having uprights, a vertically-movable plate engaging said uprights, a series of plungers carried by said plate, a mold having a series of apertures for said plungers, said table being provided with a series of openings registering with the openings in the mold, a series of receptacles extended beneath the table and from the openings therein, means for supporting said receptacles, a sliding plate operating over the openings in the table, the table being provided with guide means for said sliding plate, means for retaining the vertically-movable plate in a raised position, a framework projecting downwardly from the vertically-movable plate, and a lever having its fulcrum upon a fixed part of the apparatus and having a sliding pivoted connection with said framework, substantially as and for the purpose set forth.

In testimony that I claim the foregoing as my invention I have signed my name, in presence of two witnesses, this 15th day of November, 1897.

JOHN McEWEN.

Witnesses:
C. SEDGWICK,
B. McCOMB.